Oct. 19, 1965  C. LUDWIG  3,212,454
RAILROAD CAR PUSHING APPARATUS
Filed Oct. 10, 1963  12 Sheets-Sheet 1

INVENTOR.
CARL LUDWIG
BY
Justin J Macklin
ATTORNEY.

Oct. 19, 1965 C. LUDWIG 3,212,454
RAILROAD CAR PUSHING APPARATUS
Filed Oct. 10, 1963 12 Sheets-Sheet 5

INVENTOR.
CARL LUDWIG
BY
Justin U Macklin
ATTORNEY

Oct. 19, 1965   C. LUDWIG   3,212,454
RAILROAD CAR PUSHING APPARATUS
Filed Oct. 10, 1963   12 Sheets-Sheet 6

INVENTOR.
CARL LUDWIG
BY Justin W. Macklin
ATTORNEY.

Oct. 19, 1965   C. LUDWIG   3,212,454
RAILROAD CAR PUSHING APPARATUS
Filed Oct. 10, 1963   12 Sheets-Sheet 8

INVENTOR.
CARL LUDWIG
BY
Justin W Macklin
ATTORNEY.

Oct. 19, 1965   C. LUDWIG   3,212,454
RAILROAD CAR PUSHING APPARATUS
Filed Oct. 10, 1963   12 Sheets-Sheet 12

INVENTOR.
CARL LUDWIG
BY
Justin U Macklin
ATTORNEY.

United States Patent Office 3,212,454
Patented Oct. 19, 1965

3,212,454
RAILROAD CAR PUSHING APPARATUS
Carl Ludwig, Cleveland, Ohio, assignor to McDowell-Wellman Engineering Company, Cleveland, Ohio, a corporation of Ohio
Filed Oct. 10, 1963, Ser. No. 315,237
13 Claims. (Cl. 104—176)

This invention relates, as indicated, to apparatus for moving railroad cars, and more particularly to apparatus for moving one or more loaded railroad cars into position for transfer of bulk material to or from the car. Still more particularly, this invention relates to apparatus for sequentially advancing one or more gondola-type cars in a train, such as a unit train, into a rotary car dumping device for emptying the contents thereof without uncoupling the cars.

In transferring bulk material such as coal, iron ore, limestone, sulphur, grains, etc. from land vehicles, e.g. railroad trains, to ships for transshipment by water, time consumed in effecting the transfers in a very costly item at current demurrage rates. The present system and apparatus achieves the desirable objectives of improved efficiency and economy by facilitating the handling of loaded railroad cars in the process of transferring the bulk materials therefrom, and enabling car unloading time cycles of greatly reduced duration, and tonages of materials handled greatly increased.

To the accomplishment of the foregoing and related ends, then, the present invention consists of in the means hereinafter more particularly described in the specification and illustrated in the annexed drawings, the latter being illustrative of but a single preferred embodiment, it being understood that other means than those specifically described and illustrated may be employed without departing from the spirit of the invention.

Briefly stated, the present invention is in the provision of railroad car moving apparatus which may be installed adjacent a railroad track and which is characterized by the provision of an elongated arm which may be selectively positioned between coupled railroad cars, and which is adapted to transmit a force of sufficient magnitude to move the coupled cars at a point at or near a longitudinal center line of the railroad cars, e.g. in substantially the same vertical plane in which the draw bars of the respective coupler elements of the coupled cars lie. This force is applied for a period of time sufficient to move the coupled cars a predetermined distance, e.g. one or two car lengths, or more, as may be desired, for the purpose of inserting a loaded car into a rotary car dumping apparatus of conventional structure, and simultaneously ejecting a car which has been emptied. When a given pair of coupled cars has been advanced along the trackway a distance sufficient to place one or two loaded cars into the car dumping apparatus, the car pushing apparatus of the present invention is provided with means for withdrawing the arm from between a pair of railroad cars, retracting it to a position between a pair of loaded cars one or two cars remote from its previous position, and repositioning the arm in pushing engagement with such cars at the new location.

Thus, the present invention is in a railroad car pushing apparatus for moving a train of coupled railroad cars along a track portion comprising in combination a carriage disposed parallel to the track portion and means for guiding the carriage alongside the track portion. Car pusher arm means are carried by the carriage and are provided with an elongated arm, the distal extremity of which is adapted to be selectively positioned between a pair of coupled railroad cars for pushing engagement centrally of at least one of the cars and adjacent the coupler, and including means for selectively positioning the car pusher arm means into and out of engagement with at least one of the cars.

The present invention may be better understood by having reference to the annexed drawings which are illustrative of a preferred embodiment of the invention and alternative embodiments, and in which.

As has been indicated above, it is an important feature of the present invention that the force applied in moving a plurality of coupled railroad cars be applied in substantially the same vertical plane which includes the axes of the drawbars of the respective coupling units of each car. The reason for this is that whereas it is possible to apply a force of about 20,000 pounds at a corner of a railroad car, such as a typical coal car, without so distorting the car as to cause derailment, a pushing force of 50,000 pounds or more may be applied along the longitudinal axis of the train without causing any damage to the train or introducing unbalanced forces.

Figure 1:
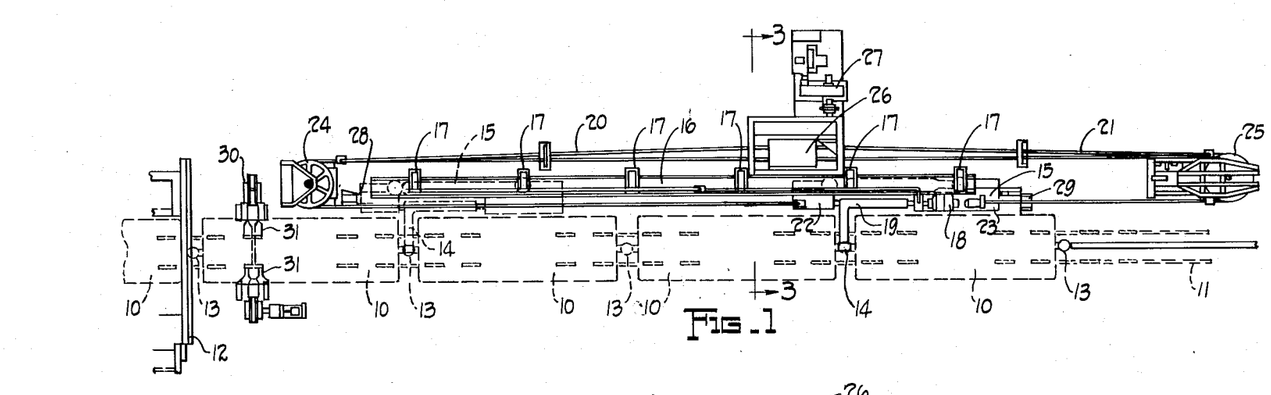
FIG. 1 is a top plan view of a railroad car pushing apparatus of the present invention showing in general arrangement a series of coupled railroad cars (shown in dotted lines), a car engaging arm in the engaged position, the arm supporting and transporting carriage, and cable means for moving the carriage to advance the coupled train into car dumping means, partially shown.
Figure 2:
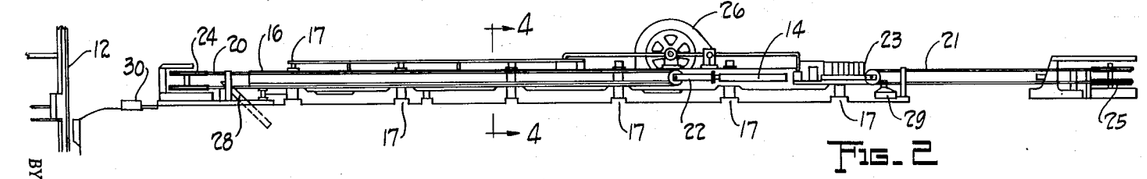
FIG. 2 is a side elevation of the apparatus shown in FIG. 1.
Figure 3:
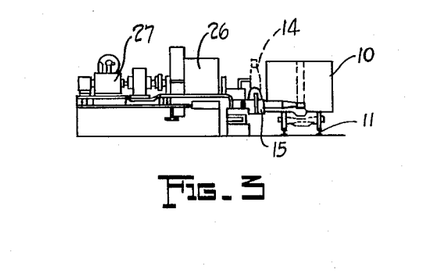
FIG. 3 is a cross-sectional view of the apparatus taken in the plane indicated by the line 3—3 in FIG. 1 and showing the general arrangement of the car engaging arm and the motive apparatus for moving the arm carriage.

Referring now more particularly to FIGS. 1, 2 and 3, there is here shown in general arrangement, an apparatus in accordance with the present invention. A plurality of railroad cars 10 are shown in dotted outline representing a portion of a coupled unit train of gondola-type cars carried by track 11. Track 11 leads from right to left as shown into a rotary railroad car dumper apparatus 12 partially shown in FIGS. 1 and 2. Rotary car dumper apparatus 12, which forms no part of the present invention, may be any conventional rotary railroad car dumping apparatus which is adapted to receive a single car, or a plurality of railroad cars, and to empty such cars by revolving them, preferably about an axis which is the same as the longitudinal axis of the drawbars of the couplings 13 joining the cars 10. Couplings 13 are desirably of the rotatable type so that the car or cars 10 being emptied by the rotary dumper 12 may remain coupled to the balance of the train, as in a "unit train" which travels as a unit between a loading point remote from the unloading point.

To move the cars 10 sequentially into the rotary dumper 12, there is provided a car engaging arm 14 mounted on a carriage 15 which is adapted to move back and forth along a carriage trackway 16 disposed parallel to railroad track 11. In the apparatus shown in FIG. 1, carriage trackway 16 is of sufficient length to permit movement of the carriage 15 a distance sufficient to move two cars 10 into a tandem type rotary car dumper 12.

Carriage 15 is shown in dotted lines in an advanced position at the left hand extremity of the apparatus as shown in FIG. 1, two railroad car lengths in advance of its initial position at the right hand extremity of trackway 16.

Figure 4:
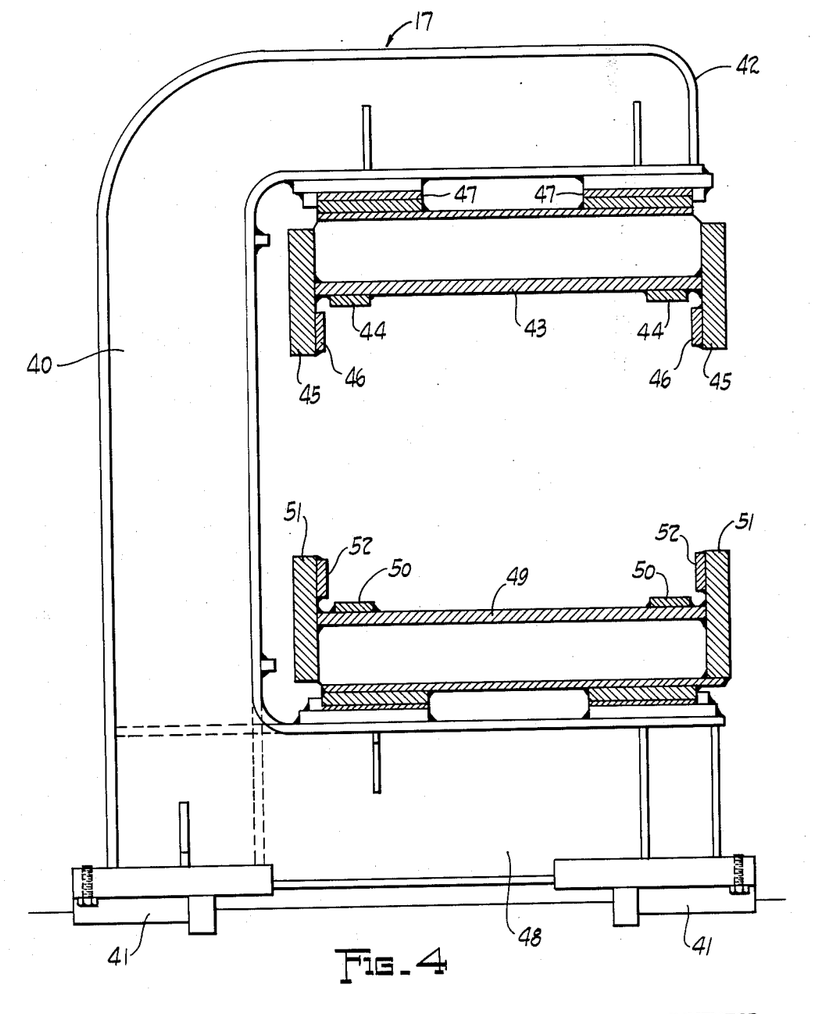
FIG. 4 is a cross-sectional view on an enlarged scale of a carriage support pedestal and the carriage trackway supported thereby as it appears in the plane indicated by the line 4—4 of FIG. 2.

Trackway 16 is supported on a plurality of spaced pedestals 17, a typical example of which is shown in much enlarged detail in FIG. 4.

As will be hereinafter more particularly explained, the distal extremity of pusher arm 14 is provided with locating means to which controls are responsive for positioning the head or distal extremity in pushing engagement with the railroad cars 10 so that the application of the pushing force is along a line which is parallel to and immediately adjacent an axis extending longitudinally of the train and including the longitudinal axes of the drawbars of the couplers 13. As shown in FIG. 1, motor means 18 are provided for rotating the arm 14 about an axis through the proximal extremity of the arm 19 for engagement with cars 10 and disengagement therefrom. Engagement and disengagement of the arm 14 may be automatically achieved by any suitable means, and is preferably programmed with the relative position of cars 10 on the track, and the car dumping cycle of the dumper 12. Movement of the carriage 15 along the carriage trackway 16 in the apparatus shown in FIGS. 1, 2 and 3 is conveniently effected by means of advancing cables 20 and retracting cables 21 suitably secured to the head extremity 22 of carriage 15 and the tail extremity 23, respectively, and reeved through suitable head sheave 24 and adjustable tail sheave 25 for coaction with cable winding drum 26. Drum 26 is powered by suitable motor means generally indicated at 27. In order to arrest carriage 15 at the extremities of its stroke along track 16, there are conveniently provided terminal bumper means such as head bumper 28 and tail bumper 29. Safety stop means 30 may be provided having retractable wheel chocks 31 adapted to be positioned on the track 11 in the nips fore and aft of the railroad car truck wheel and adjacent the point of tangency thereof with the track 11. When the safety stop means 30 is activated, truck wheels on each side of the car are prevented from moving in either direction, and the train is held stationary for completion of the dumping cycle. Any convenient means for stabilizing the train in a fixed position relative to the track may be employed during the dumping cycle. In the embodiment shown in FIGS. 1–3, the safety stop mechanism 30 is provided with control means (not shown) coacting between the rotary car dumper and the carriage moving machinery 27 and 18 for proper programming of the operating of these parts. Suitable limit switches and striker plates coacting at the carriage-trackway assembly, the safety stop means, and rotary car dumper provide the actuating signals for the various operations to be performed by each of the parts.

FIG. 4, as indicated above, shows a typical pedestal on a much enlarged scale for supporting the trackway along which the pusher arm carriage 15 advances and retracts. As also indicated above, a plurality of such pedestals 17 are provided at spaced intervals along the trackway. Referring more particularly to FIG. 4, there is here provided a pedestal frame 40 of generally C-shape supported on a suitable foundation 41 and having secured to the laterally extending upper arm 42, upper trackway bed 43 having vertical wheel runners 44 secured thereto by any suitable means, such as welding. Bed 43 is provided with marginal flanges 45 extending at right angles to bed 43 and providing a support for horizontal stabilizer wheel runners 46 secured thereto by any suitable means, e.g., welding.

Upper trackway bed 43 is secured to laterally extending upper arm 42 of pedestal 40 by any suitable means which may include any requisite number of shims 47. The securing means may either be bolts, or welding as shown in FIG. 4.

In like manner, the lower laterally extending arm 48 provides a support for lower trackway bed 49 having vertical wheel runners 50 secured thereto. Vertical flanges 51 provide a support for horizontal stabilizer wheel runners 52. Lower trackway bed 49 is secured to the laterally extending pedestal arm 48 in the same manner as upper trackway bed 43. Trackway beds 43 and 49 are of sufficient length to provide the desired travel of about 34 feet for a one-car stroke, or approximately 68 feet for a two-car stroke.

Figure 5:
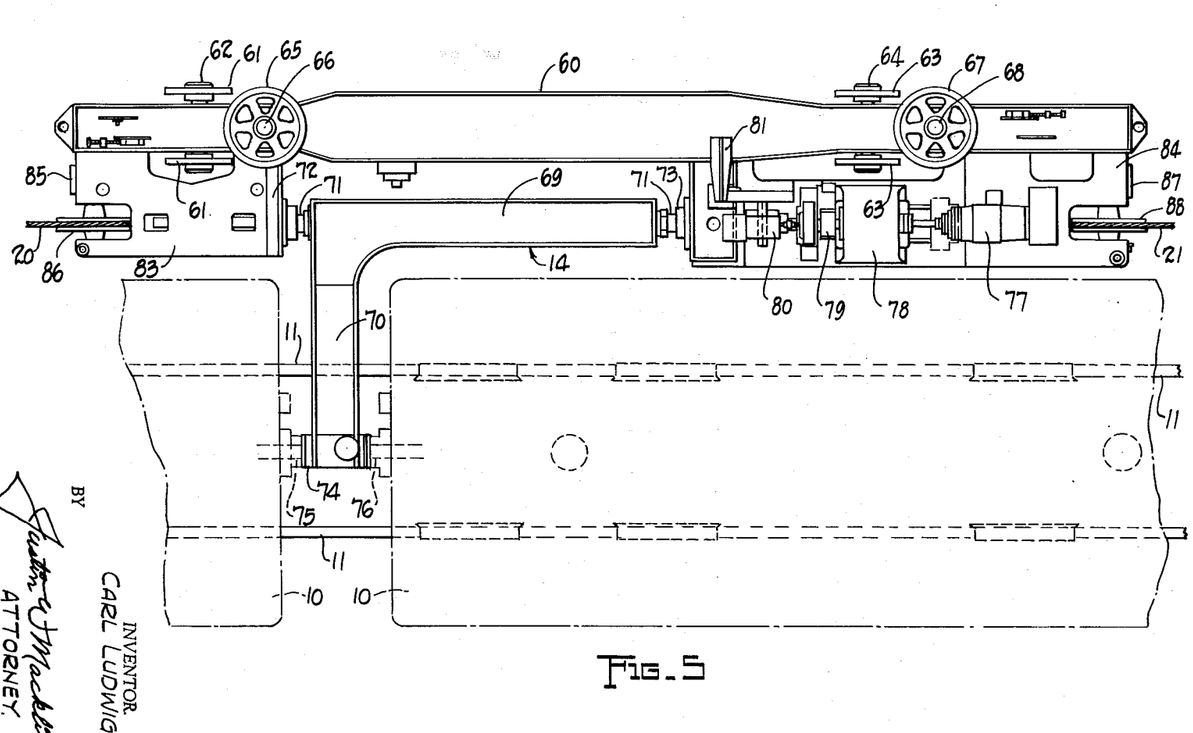
FIG. 5 is an enlarged top plan view of the pusher arm and supporting carriage showing in general arrangement the arm in coupling engaging position and the means for raising and lowering the coupling engaging arm.
Figure 6:
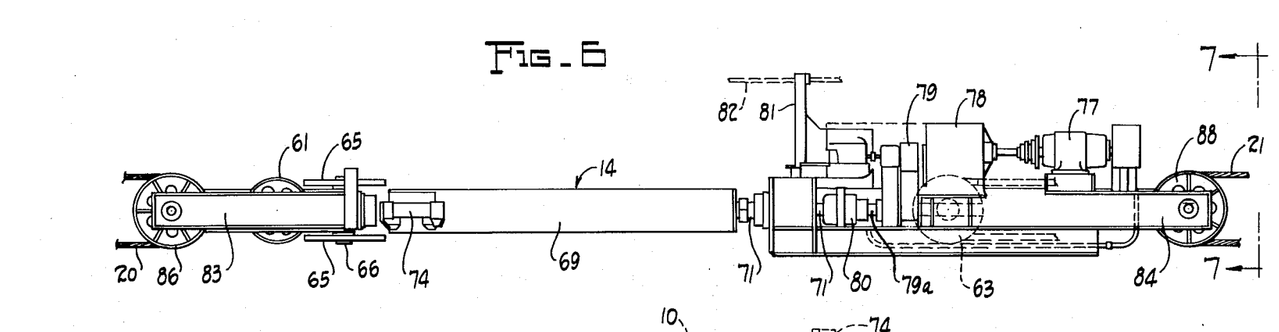
FIG. 6 is a side elevation of the apparatus shown in FIG. 5.
Figure 7:
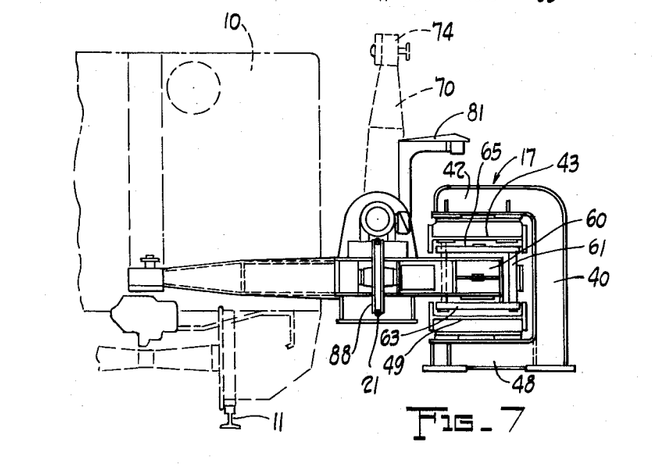
FIG. 7 is an end elevation of the apparatus shown in FIGS. 5 and 6.

Referring now more particularly to FIGS. 5, 6 and 7, there is here shown in greater detail the structure of the pusher arm carriage, the pusher arm and the mechanism for rotating the arm about an axis parallel to the railroad track for positioning the arm into and out of engagement with the railroad cars. Accordingly, there is provided a carriage body 60 of generally welded steel box frame construction and provided with forward vertical wheels 61 mounted for rotation on a horizontal axle 62 carried by the carriage body 60. To the rear, there is also provided a pair of rearward vertical wheels 63 mounted for rotation on horizontal axle 64 carried by carriage body 60. To counteract the strong lateral forces imposed upon the carriage body 60 by the imposition of a load at the end of a laterally extending arm, carriage 60 is provided with pairs of horizontally disposed stabilizer wheels, namely, forward stabilizer wheels 65 mounted on vertical axle 66 above and below the carriage body 60; and rearward stabilizer wheels 67 mounted on vertical axle 68 above and below the carriage body 60. The axial spacing between the vertical running wheels 61 and 63 is such that these wheels are adapted to contact the trackway runners 44 and 50 (FIG. 4). In like manner, the axial spacing between the two forward stabilizer wheels 65 and two rearward stabilizer wheels 67 is such as to be accommodated by upper lateral runners 46 and lower lateral runners 52. The car pusher arm, generally indicated at 14, is of generally L-shape, and has a portion 69 extending parallel to the railroad track 11 and having extending at right angles thereto from one extremity, laterally extending arm portion 70. Arm portion 69 provides a housing for horizontally extending shaft 71 which is journaled for rotation in head bearing 72 and tail bearing 73. The distal extremity of laterally extending arm portion 70 is provided with a pushing head 74 which is positioned for pushing coaction between coupled railroad cars 10 in a vertical plane which includes the longitudinal axis of the draw bars of the couplers in the unit train. Draw bars 75 and 76 are partially and diagrammatically represented in FIG. 5 in dotted lines and show the relationship of the pushing head 74 with respect thereto.

The motive power for rotating the laterally extending arm portion through an arch of about 90°, from an upright position as shown in dotted lines in FIG. 7 to a horizontal position for pushing engagement with cars 10 is provided by a reversible motor 77 operating through a reducer 78 and gears 79 including drive shaft gear 79a (FIG. 6), and coupled through coupling 80 to arm shaft 71. Motor 77 operates in response to controls which in turn are responsive to the position of the carriage relative to the carriage trackway, and the dumping cycle of the rotary car dumper 12 (FIG. 1). Power for the operation of the electrical equipment is supplied to the pusher arm engaging and disengaging equipment by means of power track arm 81 in sliding contact with power line 82.

Carriage body 60 is provided at each extremity with laterally extending platforms, platform 83 at the head extremity providing a support for a bearing 72 in which shaft 71 is journaled for rotation, and rear platform 84 which provides a base for the bearing 73 and the support for the motor means for rotating arm 14 into and out of engagement with the railroad cars. In the embodiment shown in FIG. 5, platforms 83 and 84 extend from the carriage body 60 at the extremities thereof toward the track 11.

Platform 83 at the head extremity of carriage body 60 is provided with a forward bumper 85 which is adapted to coact with bumper 28 (FIG. 2). Platform 83 also provides means for securing the draft gear including a sheave 86 journaled for rotation in platform 83, and around which advancing cable 20 is reeved.

In like manner, platform 84 if provided with a bumper plate 87 mounted for engaging coaction with tail bumper 29 (FIGS. 1–2). Platform 84 is also provided with draft gear supporting means including tail sheave 88 journaled for rotation in the platform 84 and around which retracting cable 21 is reeved.

Figure 8:
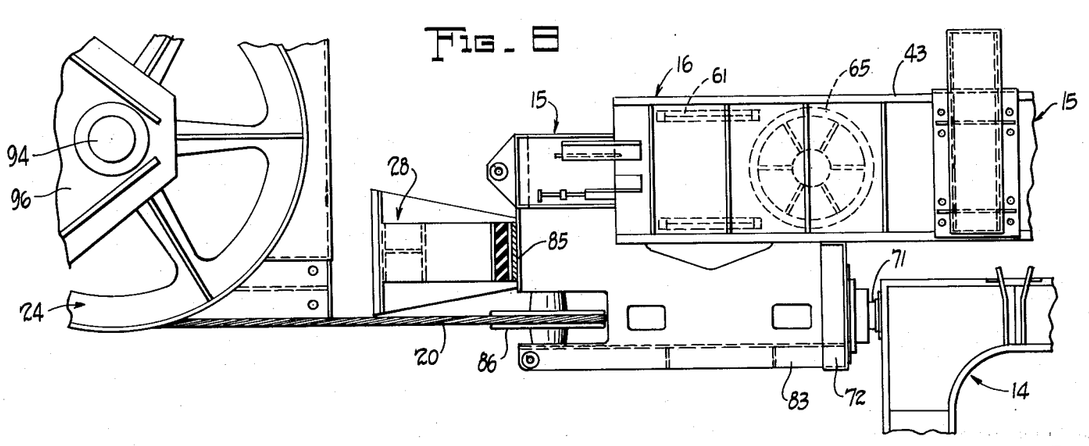
FIG. 8 is a fragmentary plan view showing the general arrangement of the head sheave and forward arm carriage bumper.
Figure 9:
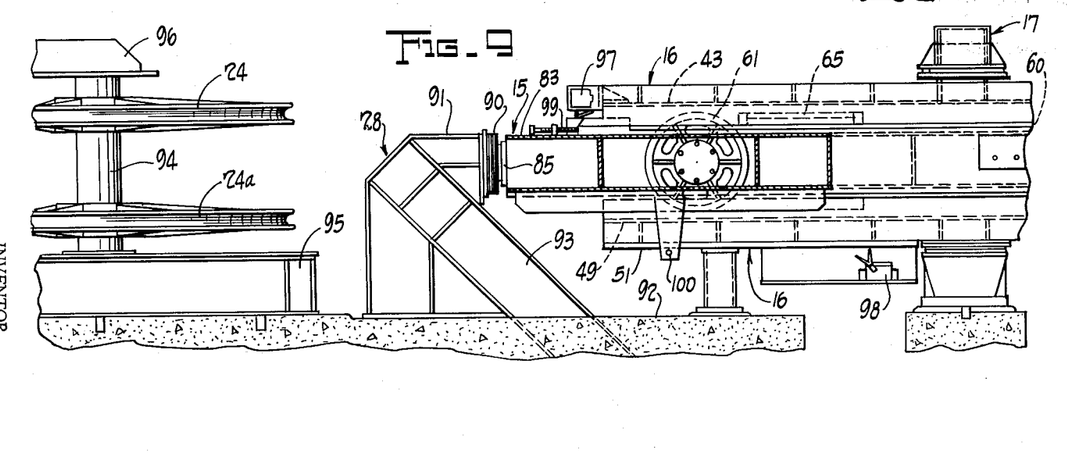
FIG. 9 is a side view of the apparatus shown in FIG. 8 with the cable removed.

FIGS. 8 and 9 show the arrangement of the equipment at the forward bumper. Fixed head sheave 24 and carriage 15 are only partially shown in FIGS. 8 and 9. As indicated above, head platform 83 is provided with a bumper plate 85 mounted for coaction with head bumper 28 which limits the forward motion of the pusher arm carriage assembly. As shown in FIGS. 8 and 9, head bumper 28 is provided with a bumper space 90 supported on a frame 91 which is securely anchored to the foundation 92 by means of an anchor beam 93 embedded therein. Foundation 92 is desirably formed of an inorganic setable material, such as concrete.

Head sheave 24 is mounted for rotation on vertical axle 94 which is supported from base 95, and supported and maintained in vertical position by upper support 96. In the embodiment shown in FIGS. 8 and 9, two sheaves 24 and 24a receive the cable 20 from the head sheave 86 rotatably mounted on platform 83 and reverse the direction of draft cables 20, as best shown in FIG. 1 to the cable drum 26 located centrally of the car pushing apparatus and adapted to pick up the advancing or retracting cables while paying out the other, as the case may be, to effect advancing and retracting movement of the car pushing apparatus.

Also as shown in FIGS. 8 and 9, there are provided control devices, such as limit switches 97 and 98. These are adapted to coact between the stationary trackway generally indicated at 16 and the movable pusher arm carriage generally indicated at 15. Carriage 15 is provided with suitable limit switch actuating devices such as striker 99 and striker 100 appropriately positioned and secured thereto to interrupt the electrical circuit controlling the forward movement of the carriage, and to adjust the electrical circuit in such a manner as to effect retarding of the forward movement of the carriage as it approaches the bumper 28.

Figure 10:
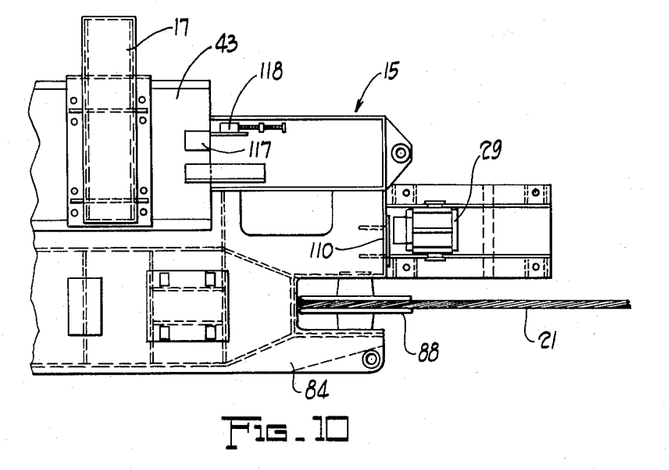
FIG. 10 is a fragmentary plan view showing the general arrangement of the retract arm carriage bumper.
Figure 11:
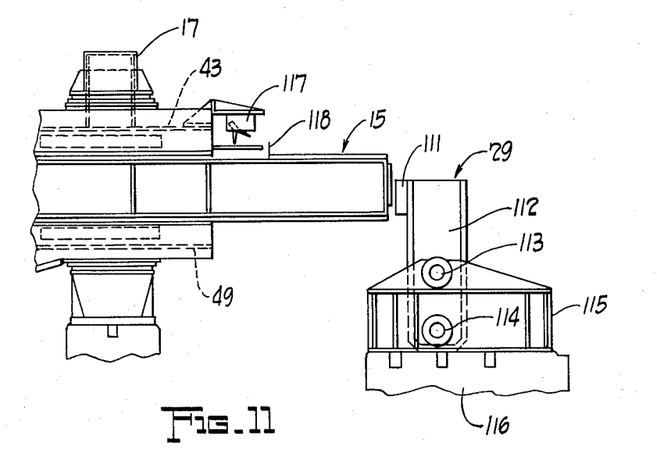
FIG. 11 is a side elevation of the apparatus shown in FIG. 10.

FIGS. 10 and 11 show in top and side elevation, respectively, the rearward portion of the car pusher assembly at the retracted position adjacent tail bumper 29. FIGS. 10 and 11 show, therefore, the rearward portion of carriage 15 including platform 84 having a bumper plate 110 mounted thereon for coaction with bumper 29. Rear bumper 29 includes a bumper face 111 mounted on bumper arm 112 which is secured as by pins 113 and 114 to base 115 securely anchored in foundation 116. Base 116 is conveniently an inorganic setable material, such as concrete. As with the forward extremity of the carriage 15, control means, e.g. limit switches, such as limit switch 117 mounted for coaction with striker plate 118, control the extent of rearward travel of the carriage 15.

Figure 12:
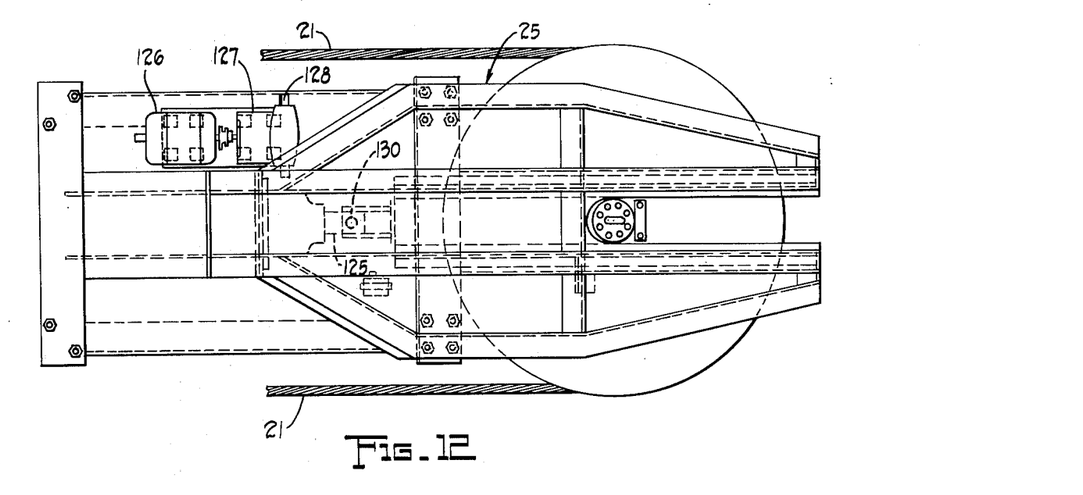
FIG. 12 is a top plan view showing in general arrangement a tail sheave assembly for the carriage moving cables.
Figure 13:
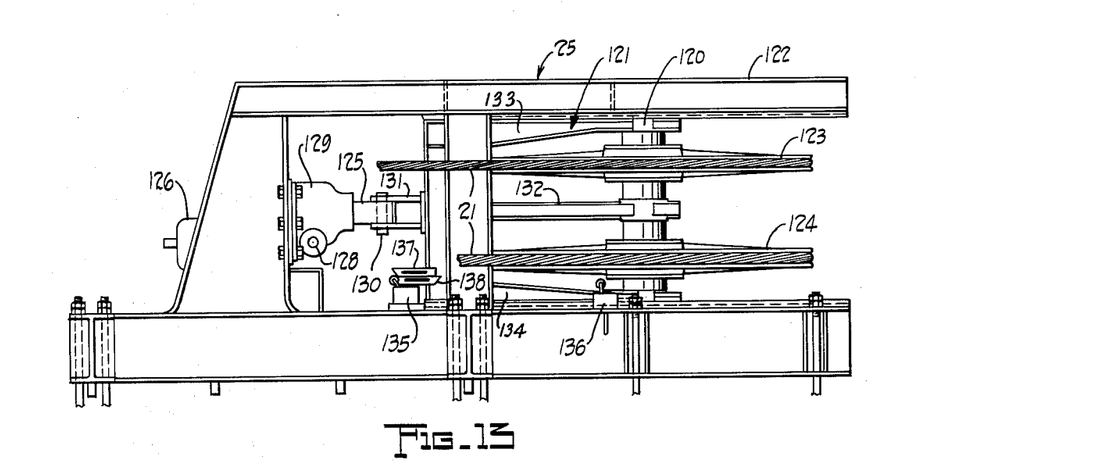
FIG. 13 is a side elevation of the apparatus shown in FIG. 12.

FIGS. 12 and 13 show top and side elevations of a tail sheave assembly through which the retracting cables 21 are reeved and their direction reversed toward the cable drum 26 as shown in FIG. 1. Tail sheave assembly generally indicated at 25 is preferably made adjustable so that any undesired slack in the cable system 21 may be taken up conveniently. Accordingly, there is provided a vertical shaft 120 which is journaled for rotation in movable frame 121 slidably supported by stationary tail sheave frame 122. Shaft 120 has mounted thereon for rotation therewith a pair of tail sheaves 123 and 124 through which the cable 21 is reeved as above indicated. A movable frame 121 is adapted to be moved back and forth within stationary frame 25 by means of a jack screw 125 driven by means of a motor 126 operating through a reducer 127 which drives a worm gear mounted on shaft 128. Worm wheel housing 129 contains a worm wheel secured to one extremity of the jack screw 25 and the worm gear mounted on shaft 128 in driving relation therewith. The distal extremity of jack screw 125 is secured to the movable frame by means of a pin 130 coacting between the jack 125 and a bracket 131 secured to movable frame 121. To provide for more efficient transmission of the force applied by the jack screw 125 to move the vertical shaft 120 carrying the sheaves 123 and 124, there may be provided an intermediate pushrod 132 through which the tail sheave pin 120 passes. The combination of upper movable frame arm 133 and lower movable frame arm 134 in combination with the intermediate arm 132 provides an efficient and stable means for transmitting a cable tightening force through the jack screw 125 to the movable frame 121. The extent of travel of the sheave fork or movable frame 121 is limited by limit switches 135 and 136, and the knockers 137 and 138 which are mounted for coaction therewith on the movable fork 121. The limit switches themselves are secured to the stationary frame 25.

Figure 14:
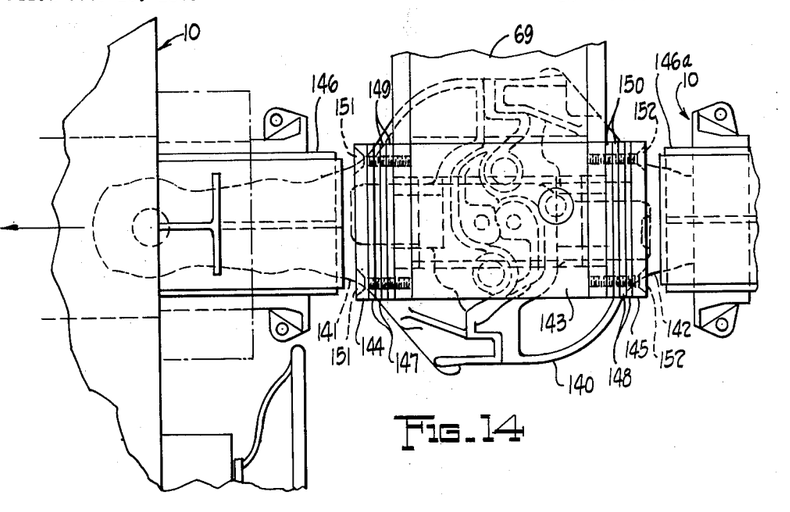
FIG. 14 is a fragmentary detail in top plan view of a pusher arm head assembly in pushing position between confronting pushing pads on adjacent coupled railroad cars.
Figure 15:
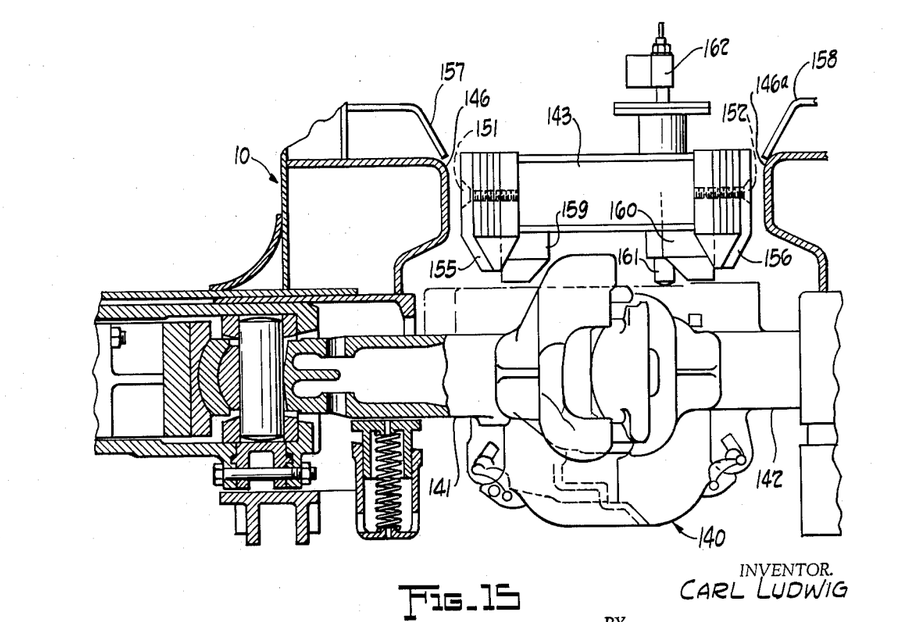
FIG. 15 is a side elevation of the apparatus shown in FIG. 14.

FIGS. 14, 15, 16, 17 and 18 show the draft gear arrangement between a pair of adjacent railroad cars, and having various forms of pushing heads adapted for applying a force sufficient to move the cars a predetermined distance along a trackway, and applying that force along an axis which is parallel to and in substantially the same vertical plane as the longitudinal axis of the train and including the axis of the draft gear associated with each car. FIGS. 14 and 15 show one pusher arm head structure in coacting position between a pair of railroad cars 10, partially shown. Railroad cars 10 are coupled by a conventional rotary draft gear generally indicated at 140. Draft gear of this type permits rotation of railroad cars in a train about an axis extending through the axes of the draw bars 141 and 142 without uncoupling adjacent cars. Accordingly, the axis of rotation of a conventional rotary railroad car dumper is made to coincide with the longitudinal axis of the train passing through the axes of symmetry of the drawbars, such as drawbars 141 and 142.

Pushing head 143 is bi-directional and is provided with laterally extending pushing heads 144 and 145 which are adapted to coact, respectively, with striker plates 146 and 146a which are suitably constructed to be able to withstand the forces applied through pushing head 143. Striker plates 146 and 146a are suitably secured to the bodies of railroad cars 10, respectively, as by welding. Pushing pads 144 and 145 are conveniently formed cold rolled steel and are spaced relative to pushing head 143 by means of shims 147 and 148 to suit the requirements of the spacings between the cars 10 and supplied in the field at the time of assembly. Resilient resinous sheets 149 and 150 are conveniently provided as shock absorbing means and self-facing means so that the pushing head pads 144 and 145 when in abutting relation with striker plates 146 and 146a (as on pushing or retracting, respectively) are properly seated thereagainst. Pushing pads 144, shims 147 and 148 and resinous sheets 149 and 150, respectively, are secured to the pushing head 143 by suitable bolt means 151 and 152, respectively. As indicated above, pushing pad 144 will be in close contacting pushing relation with striker plate 146 when the railroad cars are being advanced toward the dumper in the direction of the arrow shown in FIG. 14. When the train is being retracted from the dumper, if such is desired, then pushing pad 145 will be in pushing relation with striker plate 146a.

The lower marginal edges of the pushing pads 144 and 145, respectively, are bent inwardly toward the vertical plane passing through the longitudinal axis of the pusher arm 69 to provide guide portions 155 and 156, respectively, which coact with gateways 157 and 158 secured to adjacent railroad cars 10 for the purpose of aiding in locating the pushing head 143 in proper position over the draft gear 140. Downwardly extending projections 159 and 160 are adapted and constructed to seat upon the draft gear and limit the downward travel of pusher arm 69. The extent of travel is controlled by sensing pin or striker 161 which operates through a limit switch 162 to control the motor 77 (FIG. 5). Any suitable limit switch control means may be employed for the purpose indicated, and striker 161 may actually operate at two positions, the initial impact with the draft gear 140 operating a first limit switch to slow down the motor 77 and the second position being a full stop control for motor 77.

Figure 16:
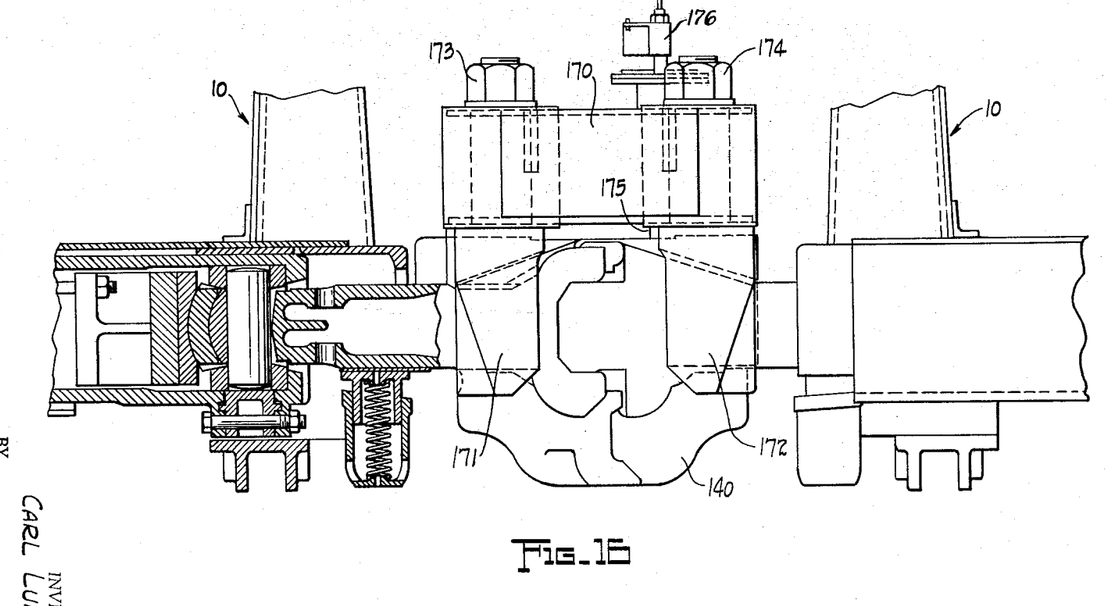
FIG. 16 is a fragmentary, partial cross-sectional side elevation of another form of pusher arm head assembly in pushing position over a rotatable coupling between adjacent coupled railroad cars.

FIG. 16 shows another form of pushing head construction which is dependent upon four downwardly extending pins so adapted and configured as to embrace the striker plate and knuckle assembly of draft gear 140. In FIG. 16, the draft gear 140 joining adjacent railroad cars 10 is identical with the draft gear in FIGS. 14 and 15. In this embodiment, striker plates 146 and 146a are unnecessary since the force for moving the train in either direction is applied directly to the coupling or draft gear 140. Accordingly, there is provided in this embodiment (FIG. 16), a pushing head 170 having four pushing pins 171 and 172 secured to the head 170 as by nuts 173 and 174. Only two such pins are shown in FIG. 16, the other pins being identical in function and obscured by pins 173 and 174 in the drawing. The draft gear confronting faces of pins 171 and 172, for example, are configured for maximum contacting area with the draft gear 140, and the four pins being so spaced relative to each other as to permit nesting of the draft gear 140 within the space marginally outlined by the four pins including pins 173 and 174 and the underside of the head, respectively. In the same manner as with the apparatus shown in FIGS. 14 and 15, there is provided a sensing pin 175 which coacts with limit switch control means 176 in the manner aforesaid. The apparatus shown in FIG. 16 coacts to provide for transmission of pushing or retracting force in a plane which is located centrally of the train and along its longitudinal axis where the maximum force may be applied.

Figure 17:
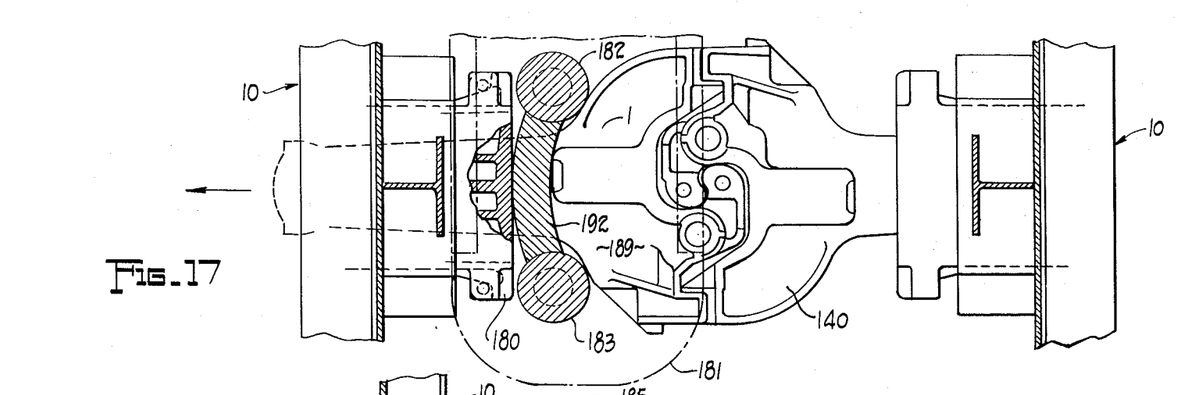
FIG. 17 is a fragmentary, partial cross-sectional plan view of another form of pusher arm head assembly in pushing position over a rotatable coupling between adjacent coupled railroad cars and in pushing engagement with a centrally located pushing pad on the forward railroad car.
Figure 18:
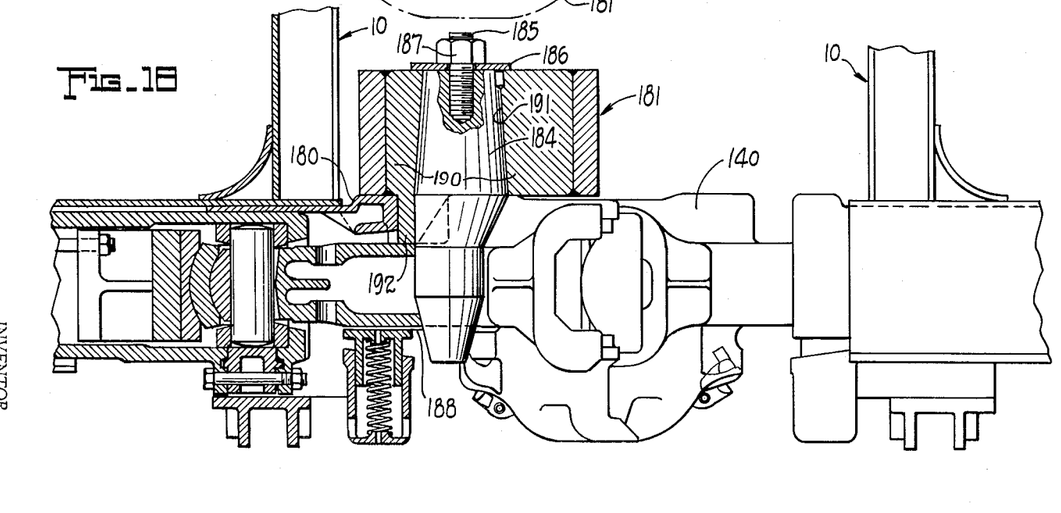
FIG. 18 is a side elevation of the apparatus shown in FIG. 17.

FIGS. 17 and 18 illustrate a preferred embodiment of a pushing head structure which is also adapted to impart a force sufficient to move a train of coupled cars along a longitudianl axis of the train and closely adjacent the axis of rotation of the axis of symmetry of the coupling mechanism.

There is here shown a general layout drawing of the draft gear between two railroad cars 10, partially shown and a single side pusher head assembly mounted for coaction with the forward railroad car for pushing in a direction toward the dumper as indicated by the arrow in FIG. 17. Although the draft gear 140 is of the same rotatable type as previously shown, striker casting 180 has been modified to improve the strength of the structure in order to accommodate the force applied therethrough. Pusher head 181 is provided with a pair of spaced vertically extending locator pins 182 and 183 secured to pusher head 181 through the coaction of tapered pin body 184, threaded stud 185, washer 186 and nut 187. Locator pins 182 and 183 are so contoured and spaced as to embrace the draft gear where the draw bar 188 begins to flare to form the striker portion 189. Head 181 is provided with an intermediate cast portion 190 extending between each of the tapered bores, e.g. bore 191, for each of pins 182 and 183, and a downwardly depending pushing rib 192 integrally cast therewith and intercepting pins 182 and 183 as shown best in FIG. 17. Pushing rib 192 is adapted to be brought into abutting relation with striker 180 and to transmit to striker 180 a force sufficient to move a train of railroad cars 10.

Figure 19:
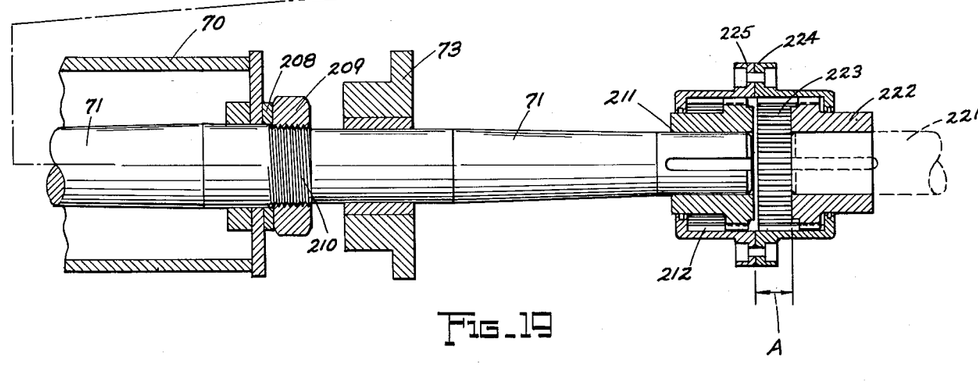
FIG. 19 is a cross-sectional view on a displaced center line of the extremities of the rotating shaft for the car engaging arm, and showing the details of fore and aft float means to allow for adjustment of the car pusher arm head with respect to the railroad car coupling.

As indicated above, FIG. 19 shows on a divided center line a fragmentary cross-sectional view showing the shaft 71 and its mode of support in head bearing 72 and tail bearing 73. It has been found that errors in railroad car manufacture and slack variations in the couplings between cars can introduce an error of plus or minus 1.5 inches in the actual position of the car couplings relative to the programmed end of travel points of the carriage. To anticipate this possible error, there has been provided a plus or minus 1.5 inch float of the arm 69 and laterally extending portion 70 relative to the carriage 60. Thus, the car engaging arm 69 will easily move when the guiding pins or surfaces on the head of pushing arm 69 are being seated on the coupling.

As shown in FIG. 19, there is provided an amount of travel A made possible by providing fore and aft float of the rotary shaft 71. The head extremity 200 of rotary shaft 71 is desirably spherical in shape and seated in a complementary spherical seat 201. Seat 201 is carried on a stud 202 on a slidable yoke 203 biased against a hydraulically actuated bellows member 204. This assembly will permit the extremity of shaft 71 to travel the distance A and to be reset to a zero position by the mechanism more specifically detailed in FIGS. 20 and 21. FIG. 19 also shows the manner of affixing the laterally extending arm 70 for integral movement with the shaft 71. The interlocking portion 205 of shaft 71 is provided with key way 206 for interlocking engagement with collar 207 which is in turn secured, as by welding, to laterally extending portion 70. Thus, when shaft 71 rotates through the 90°–93° arc, the laterally extending portion 70 and the car engaging arm 69 rotate simultaneously.

The aft portion of the shaft 71 is secured to the laterally extending portion of the carriage arm 70 by means of collar 208 and nut 209 coacting with threaded portion 210 on the shaft 71. Bearing 73 permits rotation of the shaft 71 and supports the aft extremity thereof. The detail portion of the shaft 71 is provided with a toothed collar or gear member 211 which coacts in a correspondingly toothed housing 212 which permits free floating of the aft extremity of shaft 71 for the distance A.

FIG. 19 also shows one mode of coupling the drive shaft 221 from the motor driving means 18 to the shaft 71. Shaft 221 is provided with a collar 222 which is integral with a gear 223. Coupler 224 is provided with an internal toothed surface for coacting with gear 223 and positive locking engagement therewith. Thus, when shaft 221 is rotated by motor 18, the coupler 224 is rotated simultaneously therewith. The cooperating portion 225 of coupler 224 is desirably secured to coupler 224 for rotation therewith and has a similar gear for coacting with the toothed inner surface 212. Gear member 211 secured to the driven extremity of shaft 71 is free to slide axially within coupler portion 225 to provide for the floating action of the shaft and arm assembly.

Figure 20:
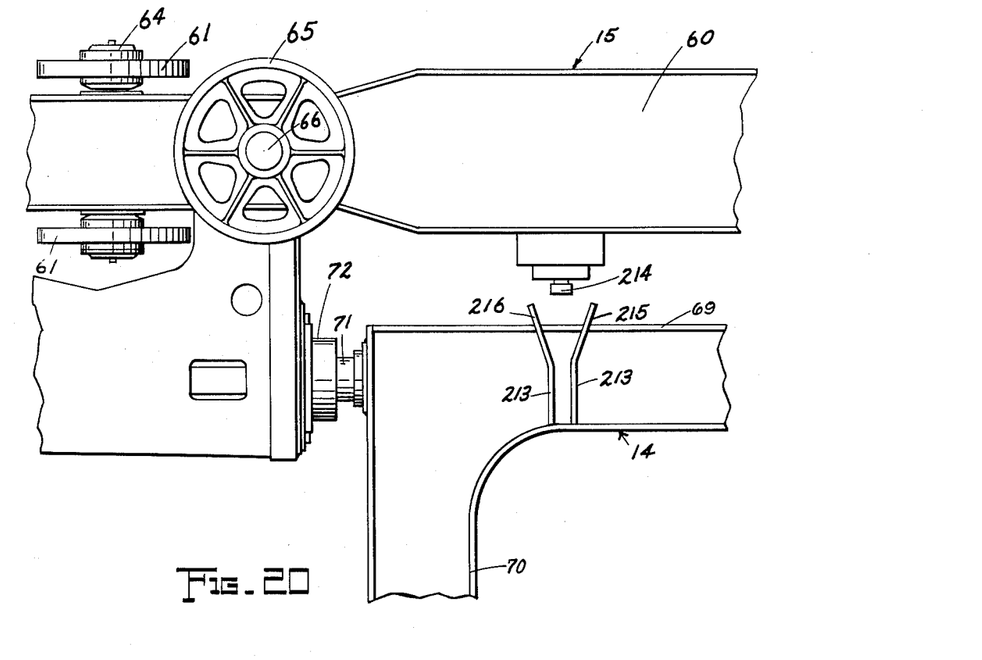
FIG. 20 is a fragmentary top view on an enlarged scale showing means for resetting the car engaging arm to a zero position.
Figure 21:
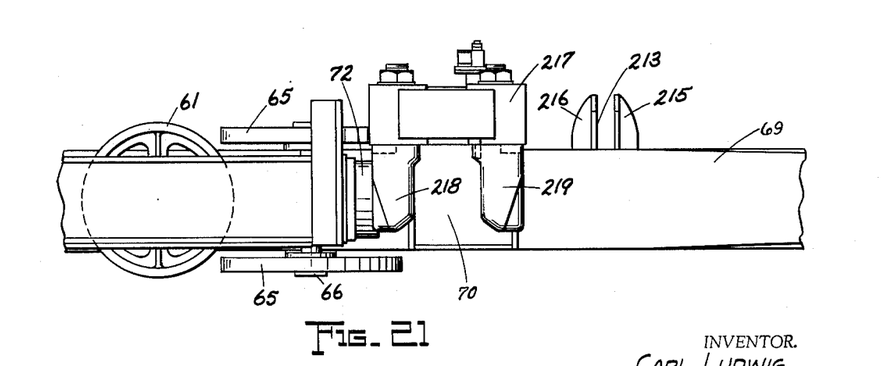
FIG. 21 is a fragmentary side elevation of the structure shown in FIG. 20.

Referring now more particularly to FIGS. 20 and 21, there is here shown in fragmentary top elevation the general carriage assembly 15 having carriage body 60 provided with vertical stabilizer wheels 61 mounted on horizontal axles 64 and the horizontal stabilizer wheels mounted on vertical axle 66. The car engaging arm generally indicated at 14 and composed of the arm portion 69 and the laterally extending arm portion 70 is provided with a centering guide 213 mounted on laterally extending arm portion 70 for coacting with interlocking pin 214 extending from carriage body 60. Guide way 213 is suitably constructed and welded to laterally extending arm portion 70, and is provided with diverging gate portions 215 and 216 adapted to engage the fixed pin 214 when the arm 14 is returned to its normal upright position. Regardless of the relative position of the shaft 71 within its permitted limited floating distance, it will be returned to a zero position by the coaction of the locating pin 214, the diverging gate portions 215 and 216 and the locating guide 213.

It will be seen, therefore, that if the pushing head 217 having depending locating pins 218 and 219 bolted thereto "find" the draft gear in a position other than normal, the free float of shaft 71 and the effect of the tapered inner surfaces of pins 218 and 219 coacting together will shift the arm 14 and shaft 71 to a new position for proper engagement of the pusher head 217 with the railroad car draft gear, (not shown in FIG. 21). After the railroad car has been advanced the proper distance, arm 14 is raised to its normal vertical disengaged position and returned to the zero position by means of the locating pin 214 fixed to the carriage 15 coacting with the guide members 213 in the manner aforesaid. Instead of the guide being secured to the pusher arm 14 and the pin 214 secured to the pusher arm 14 and the pin 214 secured to the carriage body 60, these parts may be reversed.

There has thus been provided improved railroad car moving apparatus adapted to be installed adjacent a railroad track for the purpose of advancing loaded railroad cars into conventional rotary car dumping apparatus for the purpose of emptying bulk materials therefrom. The improved apparatus hereof is adapted for use particularly with "unit trains" which are designed to be maintained as a single unit for movement between a bulk material source and a bulk material transfer point, for example, between a coal mine tipple and a pier for loading coal into a collier. Trains which are particularly useful as "unit trains" are provided with coupling gear which permits individual cars to be rotated about a longitudinal axis passing through the coupling gear without uncoupling the train for the purpose of emptying the car of its contents. To provide the proper extent of advancement of a train through a rotary car dumper, the present invention provides a railroad car advancing apparatus equipped to advance the train a predetermined distance, e.g. one car length or two car lengths, to disengage from the train and retract the same predetermined distance for the purpose of reengagement with the train and repetition of the cycle. The application of the pushing force occurs at the most advantageous position, namely adjacent the draft gear joining adjacent railroad cars. This apparatus is adapted to be programmed by suitable control means for timed sequential operation dictated by the car dumping cycle coacting with the car advancing mechanism.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A railroad car pushing apparatus for moving a train of coupled railroad cars along a track portion comprising in combination:
   (a) a wheeled carriage disposed parallel to said track portion;
   (b) means for guiding said carriage alongside said track portion;
   (c) car pusher arm means carried by said carriage and having an elongated arm the distal extremity of which is adapted to be selectively positioned between a pair of coupled railroad cars for pushing engagement centrally of at least one of said cars and adjacent the coupler, and
   (d) means for selectively positioning said car pusher arm means into and out of engagement with said at least one of said cars.

2. A railroad car pushing apparatus for moving a train of coupled railroad cars along a track portion comprising in combination:
   (a) a wheeled carriage disposed parallel to said track portion;
   (b) means for guiding said carriage alongside said track portion;
   (c) means for moving said carriage a predetermined distance along said guide means,
   (d) car pusher arm means carried by said carriage and having an elongated arm the distal extremity of which is adapted to be selectively positioned between a pair of coupled railroad cars for pushing engagement centrally of at least one of said cars and adjacent the coupler, and
   (e) means for selectively positioning said car pusher arm means into and out of engagement with said at least one of said cars.

3. A railroad car pushing apparatus for moving a train of coupled railroad cars along a track portion comprising in combination:
   (a) a wheeled carriage disposed parallel to said track portion;
   (b) means for guiding said carriage alongside said track portion;
   (c) car pusher arm means carried by said carriage and having an elongated arm rotatably mounted at its proximal extremity about an axis parallel to the track and a head portion adapted to be selectively positioned between a pair of coupled railroad cars for pushing engagement centrally of at least one of said cars and adjacent the coupler; and
   (d) means for selectively positioning said car pusher arm means into and out of engagement with said at least one of said cars.

4. A railroad car pushing apparatus in accordance with claim 3 in which the means for guiding said carriage also includes means for stabilizing the carriage.

5. A railroad car pushing apparatus in accordance with claim 3 in which the car pusher arm means includes means adapted to coact between the coupler and the head portion of said arm to locate said head portion with respect to said coupler.

6. A railroad car pushing apparatus in accordance with claim 5 in which the locating means includes a plurality of spaced fingers extending from the head portion, the spacing therebetween being adapted to receive a predetermined portion of said coupler.

7. A railroad car pushing apparatus for moving a train of railroad cars along a track portion comprising in combination:
(a) a wheeled carriage disposed parallel to said track portion,
(b) means for guiding said carriage alongside said track portion,
(c) car pusher arm means carried by said carriage and having an elongated arm the distal extremity of which is adapted to be selectively positioned between a pair of coupled railroad cars for pushing engagement centrally of at least one of said cars and adjacent the coupler,
(d) means for selectively positioned said car pusher arm means into and out of engagement with said at least one of said cars, and
(e) means for moving said wheeled carriage back and forth a predetermined distance parallel to said track portion.

8. A railroad car pushing apparatus in accordance with claim 7 in which the means for moving said carriage includes a rotatable cable drum and cable means coacting between said drum and each extremity of said carriage to move to said carriage in response to rotation of said drum.

9. A railroad car pushing apparatus for moving a train of railroad cars along a track portion comprising in combination:
(a) a wheeled carriage disposed parallel to said track portion,
(b) means for guiding said carriage alongside said track portion,
(c) car pusher arm means carried by said carriage and having an elongated arm the distal extremity of which is adapted to be selectively positioned between a pair of coupled railroad cars for pushing engagement centrally of at least one of said cars and adjacent the coupler,
(d) means for selectively positioning said car pusher arm means into and out of engagement with said at least one of said cars,
(e) means for moving said wheeled carriage back and forth a predetermined distance parallel to said track portion, and
(f) carriage arresting means for limting the extent of forward and rearward travel of said carriage.

10. A railroad car pushing apparatus for moving a train of railroad cars along a track portion comprising in combination:
(a) a wheeled carriage disposed parallel to said track portion,
(b) means for guiding said carriage alongside said track portion,
(c) car pusher arm means carried by said carriage and having an elongated arm the distal extremity of which is adapted to be selectively positioned between a pair of coupled railroad cars for pushing engagement centrally of at least one of said cars and adjacent the coupler,
(d) means for selectively positioning said car pusher arm means into and out of engagement with said at least one of said cars,
(e) means for moving said wheeled carriage back and forth a predetermined distance parallel to said track portion,
(f) carriage arresting means for limting the extent of forward and rearward travel of said carriage, and
(g) chock means coacting between said track portion and wheels of one of said railroad cars to selectively fix the position of said car on said track.

11. A railroad car pushing apparatus for moving a train of railroad cars a predetermined distance along a track portion comprising in combination:
(a) an elongated wheeled carriage having a head extremity and a tail extremity disposed parallel to said track portion,
(b) an elongated guide-way for said wheeled carriage disposed parallel to and adjacent said track portion and including runners for said wheeled carriage,
(c) means for stabilizing said carriage coacting between said carriage and said guide-way,
(d) car pusher arm means carried by said carriage and having an elongated arm the distal extremity of which is adapted to be selectively positioned between a pair of coupled railroad cars for pushing engagement centrally of at least one of said cars and adjacent the coupler,
(e) means carried by said carriage for selectively positioning said car pusher arm means into and out of engagement with said at least one of said cars,
(f) a rotatable cable drum disposed in fixed position adjacent said guide-way,
(g) motor means for rotating said drum a predetermined amount in either direction,
(h) advancing cable means coacting between said drum and the head extremity of said carriage,
(i) head sheave means disposed adjacent said track portion and coacting with said advancing cable means to reverse the direction of said cable means intermediate the head extremity of said carriage and said drum,
(j) retracting cable means coacting between said drum and said tail extremity of said carriage,
(k) tail sheave means disposed adjacent said track portion and coacting with said retracting cable means to reverse the direction of said cable means intermediate the tail extremity of said carriage and said drum, and
(l) bumper means fixedly disposed at each extremity of said guide-way for limiting the extent of travel of said carriage in either direction to a predetermined distance.

12. A railroad car pushing apparatus for moving a train of coupled railroad cars along a track portion comprising in combination:
(a) a wheeled carriage disposed parallel to said track portion;
(b) means for guiding said carriage along side said track portion;
(c) car pusher arm means carried by said carriage and having an elongated arm mounted on a shaft for rotation with said shaft, the distal extremity of said arm being adapted to be selectively positioned between a pair of coupled railroad cars for pushing engagement centrally of at least one of said cars and adjacent the coupler;
(d) shaft floating means coacting with said shaft and limiting lateral movement of said shaft in a direction parallel to the track portion, the extent of such lateral movement corresponding to the extent of variation in car length and slack variations in the car coupling;
(e) means coacting between said carriage and said car pusher arm means for resetting the position of said car pusher arm means to a zero position with respect to said carriage; and
(f) means for selectively positioning said car pusher arm means into and out of engagement with said at least one of said cars by rotating said arm on said shaft.

13. A railroad car pushing apparatus for moving a train of coupled railroad cars along a track portion in either direction comprising in combination:
(a) a wheeled carriage disposed parallel to said track portion;

(b) means for guiding said carriage parallel to said track portion;

(c) car pusher arm means carried by said carriage and having an elongated arm, the distal extremity of which is adapted to be selectively positioned into and out of engagement with said train, said distal extremity including means adapted to coact centrally of said train for moving said train in either direction along the track when said distal extremity is engaged with said train.

References Cited by the Examiner

UNITED STATES PATENTS

| | | | |
|---|---|---|---|
| 422,653 | 3/90 | Stevens | 213—224 |
| 1,117,636 | 11/14 | Cederlund | 104—176 |
| 1,325,536 | 12/19 | Ramsay | 214—52 |
| 1,706,211 | 3/29 | Coffey | 104—32 |
| 1,769,713 | 7/30 | Prescott | 104—26 |
| 2,199,470 | 5/40 | Taylor | 213—224 |
| 3,028,819 | 4/62 | Brosnan | 104—176 |

MILTON BUCHLER, *Primary Examiner.*

LEO QUACKENBUSH, *Examiner.*